(12) United States Patent
Sinha et al.

(10) Patent No.: US 6,611,761 B2
(45) Date of Patent: Aug. 26, 2003

(54) SONIC WELL LOGGING FOR RADIAL PROFILING

(75) Inventors: Bikash K. Sinha, Redding, CT (US); Robert Burridge, Boston, MA (US); Michael R. Kane, Bethel, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/837,794

(22) Filed: Apr. 18, 2001

(65) Prior Publication Data

US 2002/0116128 A1 Aug. 22, 2002

Related U.S. Application Data

(63) Continuation-in-part of application No. 09/741,574, filed on Dec. 19, 2000.

(51) Int. Cl.[7] ................................................ G01V 1/40
(52) U.S. Cl. .............................................. 702/6; 367/31
(58) Field of Search .......................... 702/6, 18; 367/31

(56) References Cited

U.S. PATENT DOCUMENTS

| | | | | |
|---|---|---|---|---|
| 4,698,792 A | * | 10/1987 | Kurkjian et al. | 367/31 |
| 5,077,697 A | * | 12/1991 | Chang | 367/31 |
| 5,265,016 A | * | 11/1993 | Hanson et al. | 702/18 |
| 5,398,215 A | | 3/1995 | Sinha et al. | 367/31 |
| 5,475,650 A | | 12/1995 | Sinha et al. | 367/31 |
| 5,838,633 A | * | 11/1998 | Sinha | 367/31 |
| 6,098,021 A | * | 8/2000 | Tang et al. | 702/14 |

OTHER PUBLICATIONS

Alford, R.M. *Shear Data in the Presence of Azimuthal Anisotropy.* 56th Ann. Int'l Soc. Expl. Geophys., Expanded Abstracts. (1986) pp. 476–479.

Backus, G. and Gilbert, F. *Uniqueness in the Inversion of Inaccurate Gross Earth Data. Philisophical Transactions of Royal Society of London*, vol. 266A (1970), pp. 123–192.

Burridge, R. and Sinha, B.K. *Inversion for Formation Shear Modulus and Radial Depth of Investigation Using borehole Flexural Waves. SDR Research Report GEO–002–96–10* (Mar. 21, 1996).

DSI Dipole Shear Sonic Imager. Schlumberger Marketing Brochure.

Ekstrom, M.P. *Dispersion Estimation from Borehole Acoustic Arrays Using a Modified Matrix Pencil Algorithm.* 29th Asilomar Conf. Signals Sys, and Compt. Pacific Grove, Calif. (Oct. 31).

Fletcher, P.A. et al. *Using Fracturing as a Technique for Controlling Formation Failure. SPE 27899*, Western Regional Mtg, Long Beach, CA (Mar. 23–25, 1994) pp. 511–519.

(List continued on next page.)

Primary Examiner—Edward Lefkowitz
Assistant Examiner—Anthony Gutierrez
(74) Attorney, Agent, or Firm—Martin M. Novack; William B. Batzer; John J. Ryberg

(57) ABSTRACT

A method for determining a radial profile of sonic shear velocity of formations surrounding a fluid-containing borehole, including: suspending a logging device in the borehole; transmitting sonic energy from the logging device to establish flexural waves in the formation; receiving sonic energy from the flexural waves and producing, from the received sonic energy, measurement signals at a number of frequencies; determining, at each frequency, the flexural wave velocity in the formation; deriving sonic compressional and shear velocities of the substantially undisturbed formation; deriving sonic compressional velocity of the borehole fluid; and determining the radial profile of sonic shear velocity from the derived compressional and shear velocities of the substantially undisturbed formation, the derived compressional velocity of the borehole fluid, and the flexural wave velocities.

23 Claims, 14 Drawing Sheets

OTHER PUBLICATIONS

Harrison et al. *Acquisition and Analysis of Sonic Waveforms from a Borehole Monopole and Dipole Source for the Determination of Compressional and Shear Speeds and their Relation to Rock Mechanical Properties and Surface Seismic Data.* SPE 20557 65$^{th}$ Annual Tech Conf & Exhib. of Soc. of Pet. Eng, New Orleans, LA (Sep. 23–26, 1990) pp. 267–282.

Hornby, B. E. *Tomographic Reconstruction of Near–Borehole Slowness Using Refracted Borehole Sonic Arrivals.* Geophysics 58 (1993) 1726–1738.

Hornby, Brian E. and Change, S.K. *A Case Study of Shale and Sandstone Alteration Using a Digital Sonic Tool.* SPWLA Twenty–Sixth Annual Logging Symp. (Jun. 17–20, 1985).

Plona et al. *Measurement of Stress Direction and Mechanical Damage Around Stresses Boreholes Using Dipole and Microsonic Techniques.* SPE 47234 presented at Eurock (1998).

Plona, et al. *Stress–Induced Dipole Anisotropy: Theory, Experiment and Field Data.* Presented at SPWLA, Oslo, Norway (1999).

Renlie, Lasse. *Multiple Logging ina Formation with Stress–Relief–Induced Anisotropy.* Geophysics, vol. 59, No. 12 (Dec. 1994) pp. 1806–1812.

Sinha et al. *Borehole Flexural Modes in Anisotropic Formations.* Geophysics 59, No. 7 (Jul. 1994) pp. 1037–1052.

Sinha et al. *Dipole Dispersion Crossover and Sonic Logs in a Limestone Reservoir.* Geophysics 65, No. 2 (Mar.–Apr. 2000) pp. 390–407.

Sinha et al. *Stress Induced Azimuthal Anisotrophy in Borehole Flexural Waves.* Geophysics 61, No. 6 (1996) pp. 1899–1907.

Sinha, Bikash K. *Sensitivity and Inversion of Borehole Flexural Dispersions for Formation parameters.* Geophysical Journal International. vol. 128(1) (1997) pp. 84–96.

Sulbaran, A. L. et al. *Oriented Perforating for Sand Prevention.* SPE European Formation Damage Conf., The Hague, The Netherlands, (May 31–Jun. 1, 1999).

Tang, X. M. *Identifying and Estimating Formation Stress From Borehole Monopole and Cross–Dipole Acoustic Measurements.* SPWLA 40$^{th}$ Annual Logging Symposium, (May 30–Jun. 3, 1999).

Winkler, Kenneth W. *Effects of Borehole Stress Concentrations on Dipole Anisotropy Measurements.* Geophysics, vol. 63 (Jan.–Feb. 1998) pp. 11–17.

* cited by examiner

SONIC WELL LOGGING FOR RADIAL PROFILING

RELATED APPLICATION

This is a continuation-in-part of U.S. patent application Ser. No. 09/741,574, filed Dec. 19, 2000, assigned to the same assignee as the present application, and incorporated herein by reference.

FIELD OF THE INVENTION

This invention relates to investigation of earth formations and, more particularly, to a method and apparatus for determining properties of earth formations using sonic well logging which can characterize earth formations exhibiting complex acoustic behavior, and to a method and apparatus for determining radial variations in shear slownesses of earth formations surrounding a borehole.

BACKGROUND OF THE INVENTION

It is well known that mechanical disturbances can be used to establish acoustic waves in earth formations surrounding a borehole, and the properties of these waves can be measured to obtain important information about the formations through which the waves have propagated. Parameters of compressional, shear and Stoneley waves, such as their velocity (or its reciprocal, slowness) in the formation and in the borehole, can be indicators of formation characteristics that help in evaluation of the location and/or producibility of hydrocarbon resources.

An example of a logging device that has been used to obtain and analyze sonic logging measurements of formations surrounding an earth borehole is called a Dipole Shear Sonic Imager ("DSI"—trademark of Schlumberger), and is of the general type described in Harrison et al., "Acquisition and Analysis of Sonic Waveforms From a Borehole Monopole And Dipole Source For The Determination Of Compressional And Shear Speeds And Their Relation To Rock Mechanical Properties And Surface Seismic Data", Society of Petroleum Engineers, SPE 20557, 1990. In conventional use of the DSI logging tool, one can present compressional slowness, $\Delta t_c$, shear slowness, $\Delta t_s$, and Stoneley slowness, $\Delta t_{st}$, each as a function of depth, z. [Slowness is the reciprocal of velocity and corresponds to the interval transit time typically measured by sonic logging tools.]

An acoustic source in a fluid-filled borehole generates headwaves as well as relatively stronger borehole-guided modes. A standard sonic measurement system consists of placing a piezoelectric source and an hydrpohone receivers inside a fluid-filled borehole. The piezoelectric source is configured in the form of either a monopole or a dipole source. The source bandwidth typically ranges from a 0.5 to 20 kHz. A monopole source generates primarily the lowest-order axisymmetric mode, also referred to as the Stoneley mode, together with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional headwaves. The critical incidence angle $\theta_i = \sin^{-1}(V_f/V_c)$, where $V_f$ is the compressional wave speed in the borehole fluid; and $V_c$ is the compressional wave speed in the formation. As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle $\theta_i = \sin^{-1}(V_f/V_s)$, where $V_s$ is the shear wave speed in the formation. It is also worth noting that headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole for determining the formaton compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array of recorded dipole waveforms.

Typically, the subsurface formations are considered to be homogeneous and isotropic material, where the compressional and shear velocities, $V_c$ and $V_s$, of the formations are only a function of depth. It is known, however, that formations can be anisotropic, where the compressional and shear slownesses are a function of azimuth, $\theta$. Anisotropy can occur, for example because of layered shales, aligned fractures or differences in the magnitudes of the principle stresses in the formations. It is also known that formations may be inhomogeneous, where the slownesses become a function of radial distance, r, from the borehole. Inhomogeneity can be caused, for example, by mud-shale interactions or by mechanical damage due to stress concentrations. It was among the objectives of the invention of the parent application hereof (the above-referenced copending U.S. patent application Ser. No. 09/741,574) to provide an improved technique for characterizing earth formations exhibiting complex acoustic behavior. A technique of that invention included outputting a characterization of the formation as one of the following types: isotropic/homogeneous, anisotropic/homogeneous, isotropic/inhomogeneous, and anisotropic/inhomogeneous.

As also described in the above-referenced copending patent application, a technique can be used for determining homogeneity/inhomogeneity of a formation by comparing measured and model dispersion curves. The model data can be produced, for example, from measured compressional and shear velocities, formation mass density, mud density, mud compressional velocity, and borehole diameter (see B. Sinha, A. Norris, and S. Chang, Borehole Flexural Modes In Anisotropic Formations, Geophysics, 59, 1037–1052, 1994). If the measured data superimposes with the model data, it can be concluded that the formation is homogeneous. When the measured data deviates at high frequency, it can be concluded that the formation is inhomogeneous. When the deviation occurs at high frequencies (corresponding to probing near to the borehole), such deviation indicates that there is inhomogeneity or damage near the borehole surface. Accordingly, useful technique has been set forth for determining, at least qualitatively, the presence of near-borehole inhomogeneity; that is, the presence of phenomena such as mechanical damage in formations subject to tectonic stresses which cause radial variation in shear slownesses. However, it would be very useful to have an accurate quantitative radial profile of shear slownesses that can be employed in the evaluation of formations for the presence and/or producibility of hydrocarbons. It is among the objects of the present invention to provide a method and apparatus that addresses this need in the well logging art.

SUMMARY OF THE INVENTION

The present invention is directed to a method and apparatus for determining radial variations in shear slownesses; in other words, a radial profile of shear slowness or velocity. In accordance with an embodiment of the technique of the invention, there is disclosed a method for determining a radial profile of sonic shear velocity of formations surrounding a fluid-containing borehole, comprising the following steps: suspending a logging device in the borehole; transmitting sonic energy from the logging device to establish flexural waves in the formation; receiving, at the logging device, sonic energy from the flexural waves, and producing from the received sonic energy, measurement signals at a number of frequencies; determining, at each of said number of frequencies, the flexural wave velocity in the formation; deriving sonic compressional and shear velocities of the substantially undisturbed formation; deriving sonic compressional velocity of the borehole fluid; and determining the radial profile of sonic shear velocity from the derived compressional and shear velocities of the substantially undisturbed formation, the derived compressional velocity of the borehole fluid, and the flexural wave velocities at said number of frequencies.

In an embodiment of the invention, the method further comprises deriving the ratio of formation mass bulk density to borehole fluid mass density, and the radial profile of sonic shear velocity is determined from the derived compressional and shear velocities of the substantially undisturbed formation, the derived compressional velocity of the borehole fluid, the derived ratio of formation mass bulk density to borehole fluid mass density, and the flexural wave velocities at said number of frequencies. In this embodiment, the method also comprises the steps of deriving a dispersion function from the flexural wave velocities at said number of frequencies, and deriving a reference dispersion function from said derived sonic compressional and shear velocities of the substantially undisturbed formation and the derived ratio of formation mass bulk density to borehole fluid mass density, and determining, at selected frequencies, the differences between velocities obtained from the dispersion function and the reference dispersion function, the radial profile of sonic shear velocity being determined from said differences. Further in this embodiment, the method includes the step of deriving, at said selected frequencies, the fractional changes in flexural velocity, from the respective ratios of said differences to said velocities obtained from the reference dispersion function, the radial profile of sonic shear velocity being determined from said fractional changes in flexural velocity.

The present invention can be employed, inter alia, for assisting completion strategies relating to casing and/or perforation decisions.

Further features and advantages of the invention will become more readily apparent from the following detailed description when taken in conjunction with the accompanying drawings.

DETAILED DESCRIPTION

Figure 1:
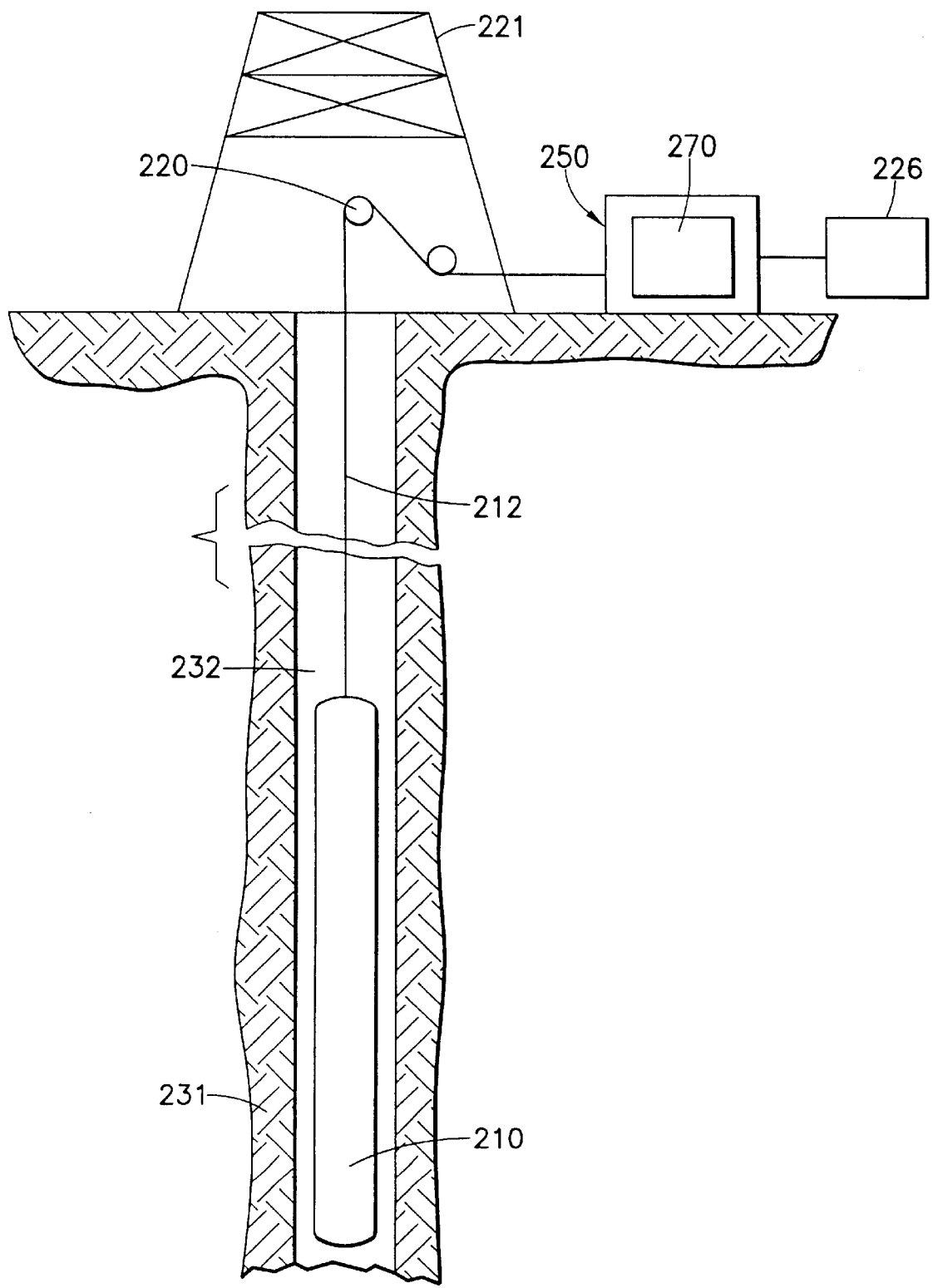
FIG. 1 is a diagram, partially in block form, of a type of apparatus that can be used in practicing embodiments of the invention.

Referring to FIG. 1, there is shown a type of apparatus which can be used in practicing embodiments of the invention. Subsurface formations 231 are traversed by a borehole 232 which is typically, although not necessarily, filled with drilling fluid or mud. A logging tool 210 is suspended on an armored cable 212 and may have optional centralizers (not shown). The cable 212 extends up the borehole, over a sheave wheel 220 on a derrick 221 to a winch forming part of surface equipment 250. Known depth gauging apparatus (not shown) is provided to measure cable displacement over the sheave wheel 220 and accordingly the depth of the logging tool 210 in the borehole 232. A device of a type well known in the art is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210. The surface equipment includes processor subsystem 270 (which can typically include a microprocessor, memory, clock and timing, and input/output functions—not separately shown), standard peripheral equipment (not separately shown), and recorder 226.

Figure 2:
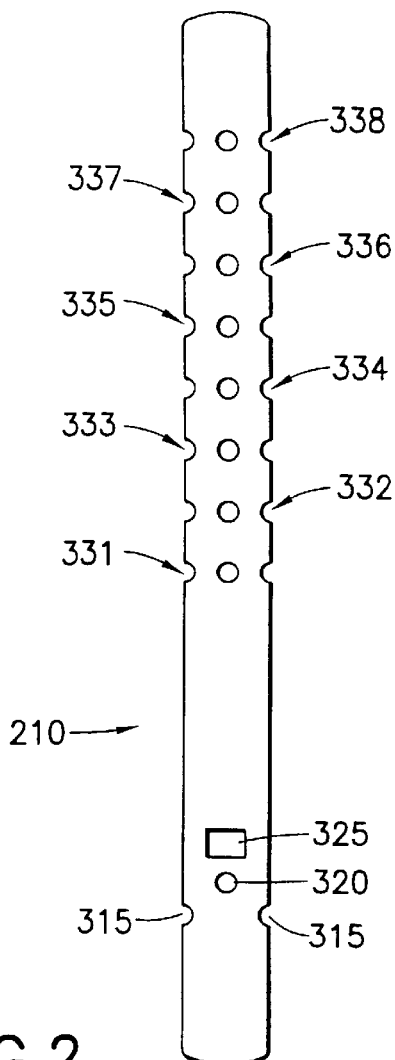
FIG. 2 is a simplified diagram of a type of downhole logging device that can be used in practicing embodiments of the invention.
Figure 3:
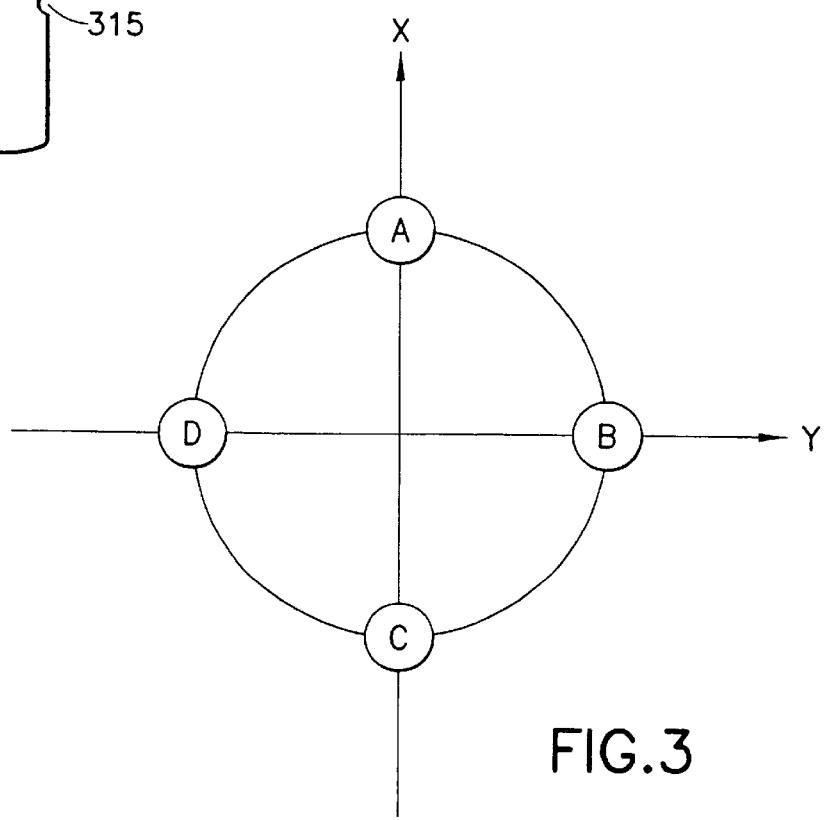
FIG. 3 is a diagram illustrating, in cross-section, the placement of hydrophones that can be used at a receiver station in the logging device of FIG. 3.

The logging device 210 may be, for example, of a type known as a Dipole Shear Sonic Imager ("DSI"—trademark of Schlumberger) generally described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. It will be understood, however, that any suitable logging device can be utilized. Further details of the logging device 210 of this example are shown in FIG. 2. The logging device 210 includes crossed dipole transmitters 315 and 320 (only one end of dipole 320 being visible) and a monopole transmitter 325, so that waves including compressional, shear, Stoneley, and flexural can be excited. Eight, or other suitable number, of spaced apart receiver stations, designated 331 through 338 each comprise four receiver hydrophones mounted azimuthally at ninety degree intervals in the surface of the cylindrical logging device. FIG. 3 shows the hydrophones, designated A, B, C, and D. In an example shown in FIG. 4, an X component can be obtained by subtracting the signals received at A and C (i.e., A–C), and a Y component can be obtained by subtracting the signals received at B and D (i.e., B–D). With four receiver elements at each receiver station, there are a total of thirty two receiver elements in this example. The receiver stations are also configurable for monopole reception.

The transmitter electronics contain a power amplifier and switching circuitry capable of driving the two crossed-dipole transmitter elements and the monopole element from a programmable waveform. Separate waveforms with appropriate shape and frequency content can be used for dipole, Stoneley and compressional measurements. The receiver electronics processes the signals from the 32 individual receiver elements located at the eight receiver stations which are spaced six inches apart. At each station, four receivers are mounted as shown in FIG. 3 which allows measurement of the dipole and crossed-dipole waveforms by differencing the outputs from opposite receivers, as previously described. Summing the outputs of the receivers can be used to produce a monopole equivalent signal. As further described in Harrison et al., supra, the receiver electronics multiplexers, filters, amplifies and channels the signals from the 32 receiver elements to 8 parallel signal paths. These eight parallel analog signals are passed to an acquisition electronics cartridge where eight 12-bit analog-to-digital converters digitize the signals from the receiver electronics. The telemetry circuitry passes the digitized information to the earth's surface.

Figure 4:
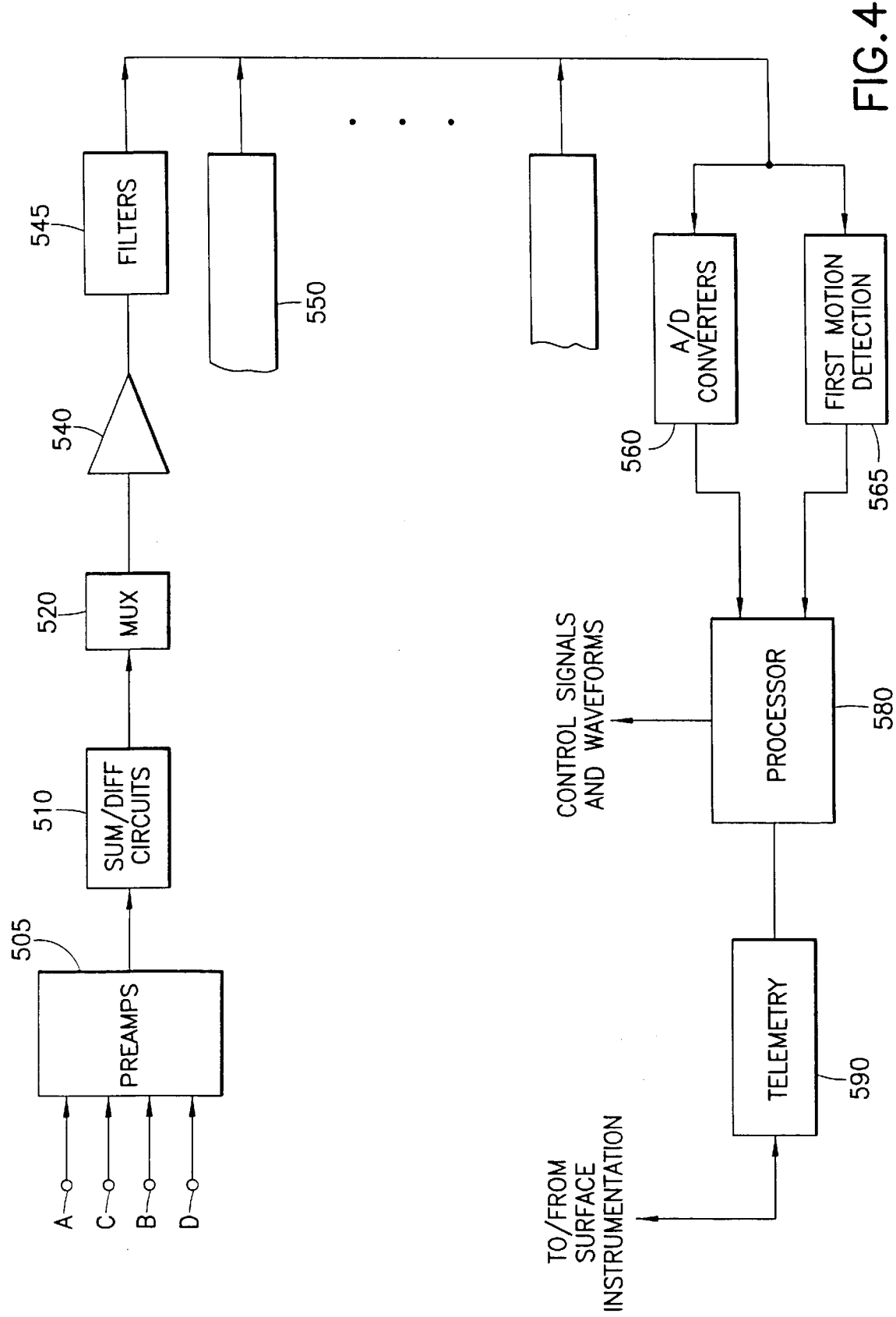
FIG. 4 is a block diagram of a portion of the electronics of the FIG. 2 logging device.

FIG. 4 shows an example of the acquisition signal path in block diagram form for one of the eight (or other suitable number of) receiver stations, as described in Harrison et al., supra. Each receiver has its own charge preamplifier (represented at 505). The output of the receivers, odd numbered pairs being in-line with the upper dipole transmitter and even numbered pairs with the lower dipole transmitter, passes into both a summing circuit (for monopole measurements) and a differencing circuit (for dipole measurements), as represented at 510. Under software control the sum or difference is selected by a multiplexer stage (block 520) and the signal passed to one of eight programmable gain amplifier stages (540) and filters (545). The other similar channels are represented by block 550. The eight parallel analog signals are passed to eight parallel 12-bit A/D converters (represented at 560) where simultaneous waveform digitization is performed. If desired, more bits can, of course, be used to advantage. After digitization, the eight waveforms are passes to the memory section associated with downhole processor 580. The processor also provides control signals and waveforms to transmitter and receiver electronics. An alternate path directs the eight analog receiver signals into threshold crossing detection circuitry or digital first motion detection, as represented at block 565. This circuitry detects the time of all up or down going threshold crossings. The digitized waveform data and the threshold crossing time data are passed to the surface using telemetry circuitry 590. It will be understood that more advanced tool implementations, having further transmitters, receivers, and/or transmitter-to-receiver (T/R) spacings, and more powerful processing capabilities, can be used even more advantageously, consistent with the principles hereof, in practicing embodiments of the invention.

In the FIG. 2 embodiment, the processing of signals recorded uphole can be implemented using a processor 270, such as a suitably programmed general purpose digital processor with memory and peripherals conventionally provided. It will be understood, however, that the processing need not be performed at the wellsite, and that signals derived at the wellsite can be processed at a remote location. It will also be understood that other suitable logging tools can be employed in practicing the invention.

The presence of a borehole in formations subject to tectonic stresses causes both radially and azimuthally varying stress concentrations. These near-wellbore stresses cause the formation shear velocity to increase with increasing radial position in the direction parallel to the maximum far-field stress direction. In contrast, the shear velocity decreases in the direction perpendicular to the maximum far-field stress direction.

As above noted, a dipole source in a fluid-filled borehole generates dispersive borehole flexural modes. The radial depth of investigation of these modes extend to about a wavelength at a given frequency. Low-frequency flexural waves probe deep and high-frequency waves probe shallow. Consequently, a dispersion analysis of borehole flexural modes can provide more detailed information about the formation than is possible with compressional and shear headwave logging. A cross-dipole dispersion crossover is an indicator of stress-induced anisotropy dominating the measurement over formation intrinsic anisotropy. In addition, very low flexural velocities at higher frequencies can indicate mechanical damage near the borehole surface.

In the following, a Backus-Gilbert (B-G) type of inversion is used in estimating radially varying shear slownesses from measured dipole dispersions (see G. Backus and F. Gilbert, Uniqueness In The Inversion Of Inaccurate Gross Earth Data; Phil. Trans. Roy. Soc. (London), A266, 123–192, 1970). As will be demonstrated, in the case of an isotropic section, the cross-dipole dispersions coincide with each other and the radial variation in shear slowness is essentially uniform. In the presence of a dipole dispersion crossover, radial variations in shear slownesses with radial polarizations parallel and perpendicular to the maximum stress direction exhibit a characteristic crossover which is consistent with the mapping of stress concentrations into plane wave velocity distributions (see B. Sinha and S. Kostek, Stress-induced Azimuthal Anisotropy In Borehole Flexural Waves, Geophysics, 61, 1899–1907, 1996).

Analyses of cross-dipole logs in a horizontal well provide information about the formation's mechanical competence that can help in planning for cased-versus open-hole completion. Large magnitudes of stress-induced shear anisotropy are indicators of borehole sections that might lead to mechanical failure more readily than sections that exhibit shear isotropy in a plane perpendicular to the borehole axis for a given rock shear strength. Large shear anisotropy caused by biaxial stresses in the plane perpendicular to the borehole axis is indicative of a potential near-wellbore mechanical damage either in the form of tensile fractures or wellbore breakouts. Shear isotropy is indicative of a stable borehole and is confirmed when the two orthogonal flexural dispersions coincide with one another.

Figure 5:
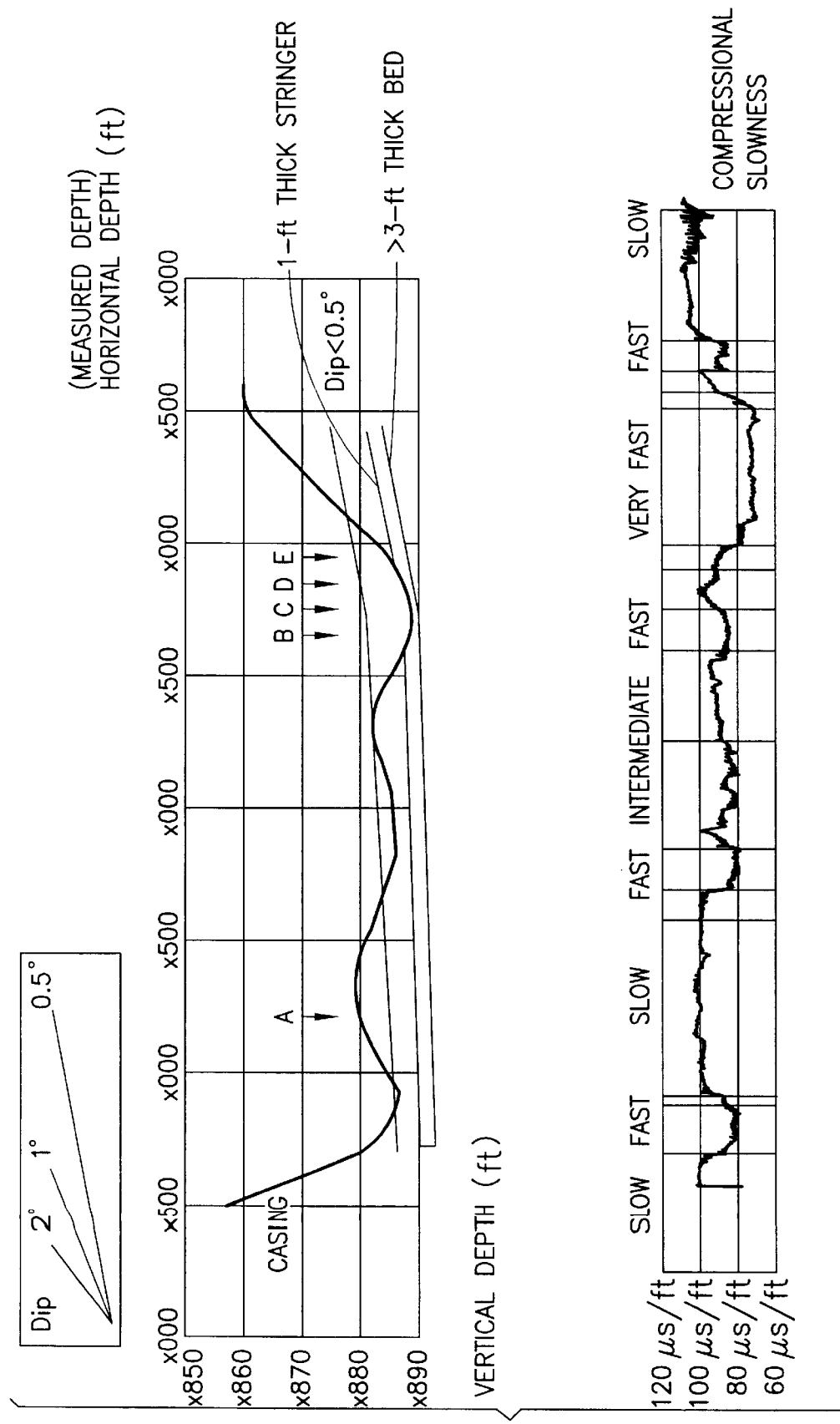
FIG. 5 shows a cross-section of a well trajectory based on logs from a sonic logging tool. The arrows at A,B,C, and E refer to depths x200, x744, x754, x850, and x904 ft, respectively.

Measured dipole dispersions in a horizontal well drilled in a limestone reservoir were analyzed (see B. Sinha, M Kane, and B. Frignet, Dipole Dispersion Crossover And Sonic Logs In A Limestone Reservoir, Geophysics, March–April 2000). This limestone reservoir in Saudi Arabia was a fast rock with porosity ranging from 10 to 35%. FIG. 5 shows the cross section of the horizontal well trajectory in the limestone reservoir together with the identification of a 1-ft thick stringer and a 3-ft thick bed. The well trajectory is approximately horizontal within a few degrees over the 2000-ft section shown in the Figure. The markers A through E denote approximate locations on the well trajectory where dispersion analyses were carried out. The objective of the analysis was to either identify isotropy in the plane perpendicular to the borehole axis or to distinguish between the intrinsic and stress-induced anisotropy. It was reported that a dipole dispersion crossover is an indicator of stress-induced anisotropy dominating over other possible sources. In an example of the present invention, radial variations in formation shear slowness are obtained from dipole dispersions in either isotropic or stress-induced anisotropic sections.

Figure 6:
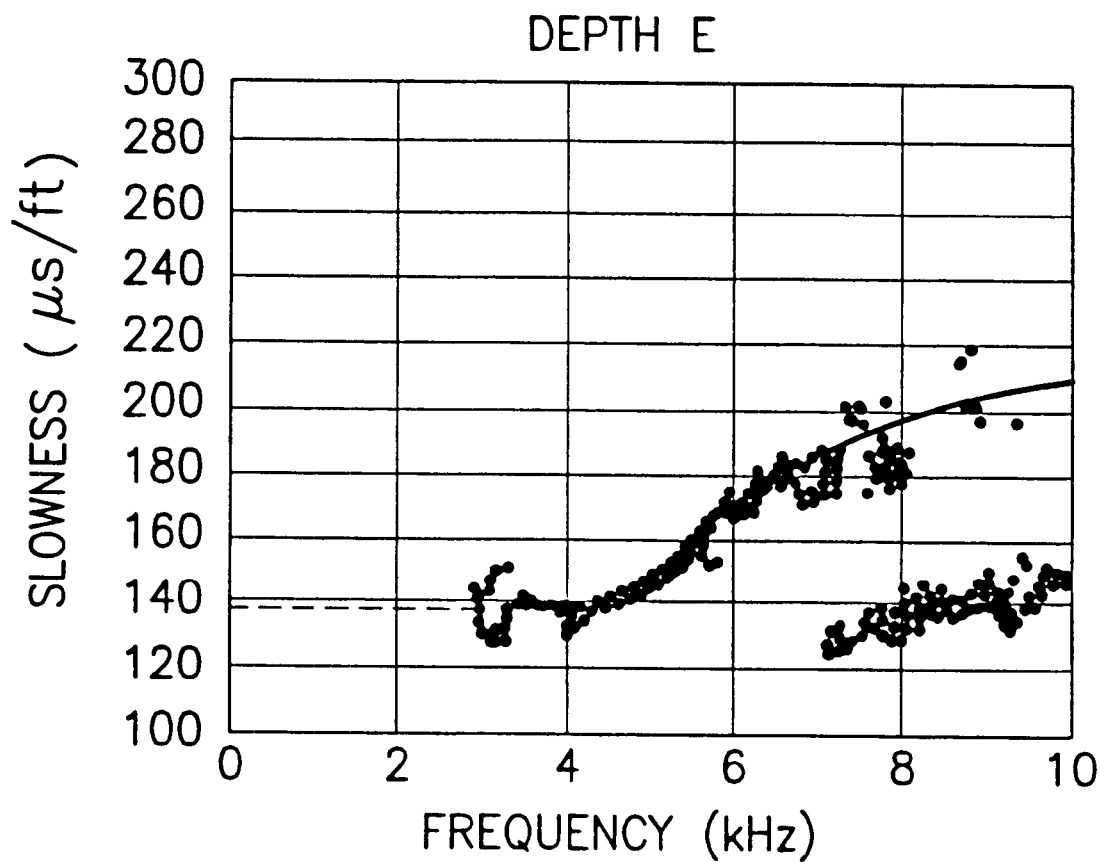
FIG. 6 is a graph of measured flexural dispersions processed from inline (solid line) and crossline (dashed line) receiver waveforms at measured depth of x904 ft. The solid line shows theoretical flexural dispersion for isotropic model parameters given in Table 1 below with an updated shear velocity from the shear log.

The depth interval between C and E exhibits shear isotropy in the plane perpendicular to the borehole axis. As an example, FIG. 6 shows the fast and slow flexural slowness dispersions obtained from the processing of arrays of cross-dipole waveforms at depth E. The solid line denotes the theoretical flexural dispersion for isotropic model parameters given in Table 1 (a being the borehole radius), and an updated shear velocity from the measured shear log. Notice that the inline and crossline flexural dispersions coincide with one another confirming shear isotropy at this depth E. Good agreement has been obtained between the measured and theoretical dispersions.

TABLE 1

Parameters For The Reference State

| Depth | a cm (in) | $\rho_b/\rho_f$ | $V_\rho$ m/s | $V_s$ m/s | $V_f$ m/s |
|---|---|---|---|---|---|
| E | 8 (3.2) | 2.056 | 4482 | 2447 | 1360 |
| B | 9 (3.5) | 2.056 | 4000 | 1800 | 1360 |

Figure 7:
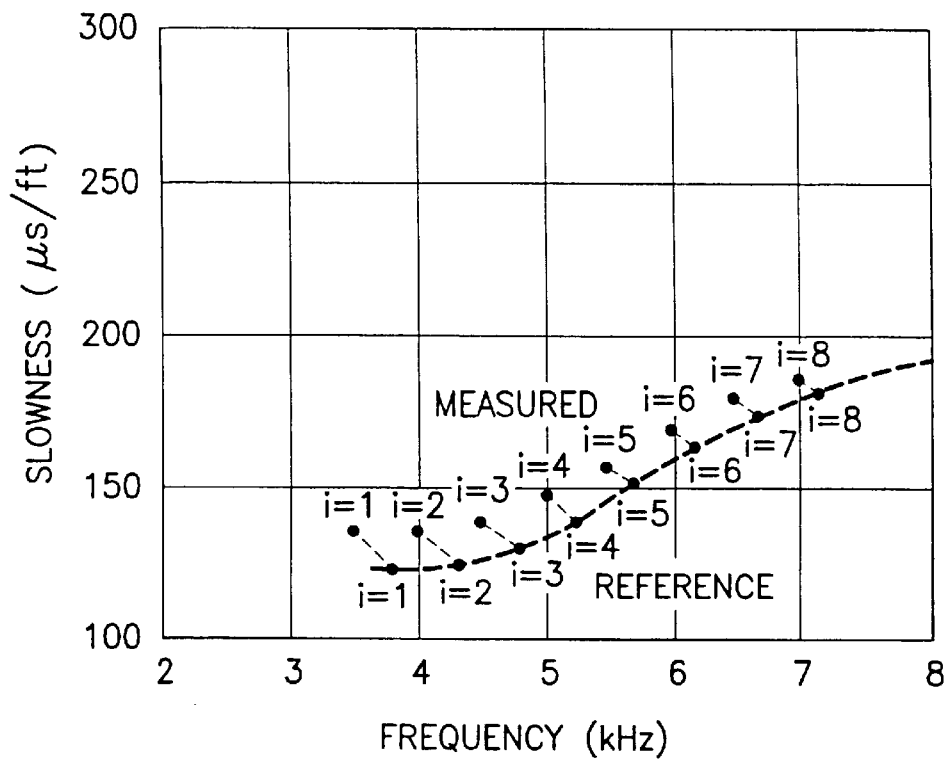
FIG. 7 is a graph of measured slowness (shown by discrete points) together with the selected slowness dispersion shown by dashed line in the reference state.
Figure 8:
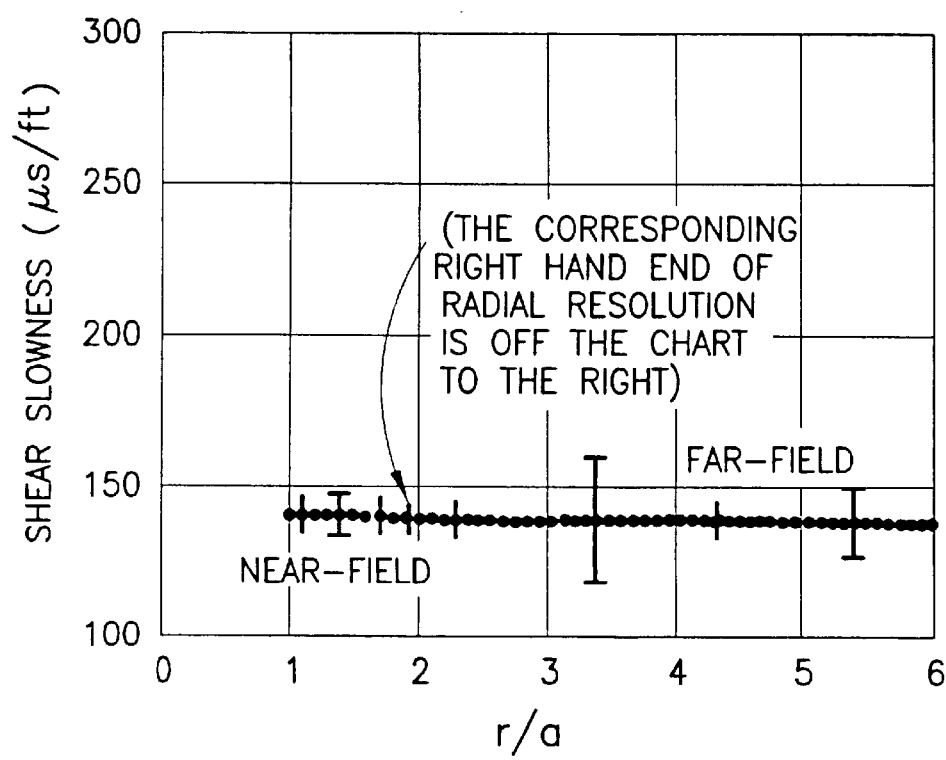
FIG. 8 is a graph of radial variation of the inverted shear slowness obtained from the measured flexural dispersion in an isotropic section. The horizontal ranges denote the radial resolution and the vertical lines denote the error bar in the inverted values.

In the application of the B-G technique, a perturbation model relates corresponding changes in the slowness dispersion caused by perturbations in formation properties. From measured flexural wave slownesses at a few discrete frequencies, a reasonable initial guess of the formation parameters in the reference state is made. These initial parameters for an assumed homogeneous and isotropic formation yield the flexural dispersion in the reference state as shown by the dashed line in FIG. 7. The measured slowness data is denoted at 8 frequencies by discrete points in the Figure. The differences between the measured and reference slownesses at the axial wavenumbers corresponding to each of th 8 data points constitute the input to the B-G procedure. In addition, kernels are calculated from the reference flexural mode eigenfunctions that are required in the inversion technique. The sum of the inverted perturbation and the background profile yields the actual profile (see R. Burridge and B. Sinha, Inversion For Formation Shear Modulus And Radial Depth Of Investigation Using Borehole Flexural Waves: $66^{th}$ Ann. Internat. Mtg., Soc. Expl. Geophys., Expanded Abstracts, 158–161, 1996). FIG. 8 shows the radial variation of inverted formation shear slowness from the 8 slowness data shown in FIG. 7. Notice the radial variation in shear slowness is essentially uniform and the far-field shear slowness is consistent with the measured shear slowness which is the low-frequency asymptote of the flexural wave slowness dispersion.

Figure 9:
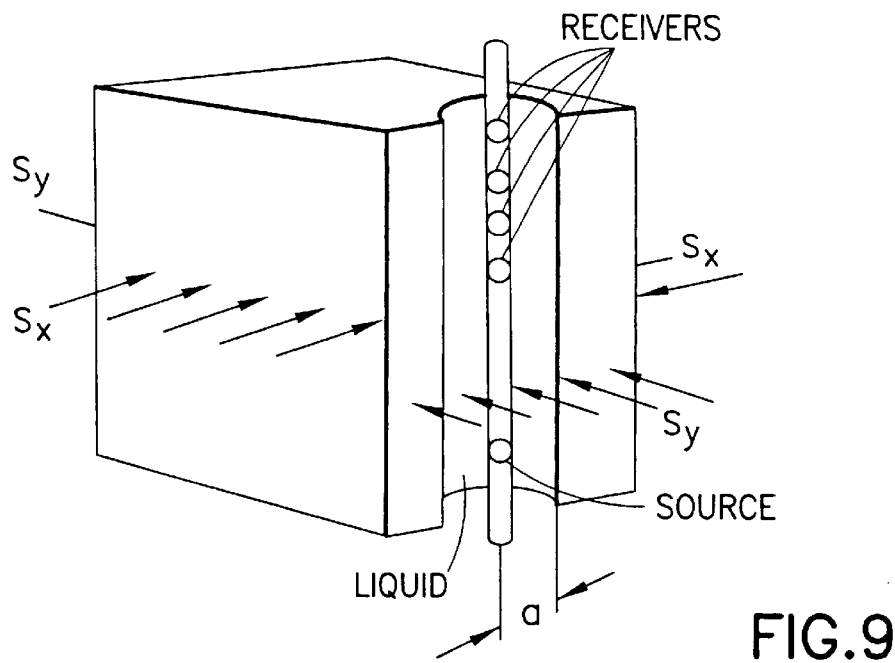
FIG. 9 is a schematic diagram of a liquid-filled borehole in a biaxially stressed formation, containing a source and receivers.
Figure 10:
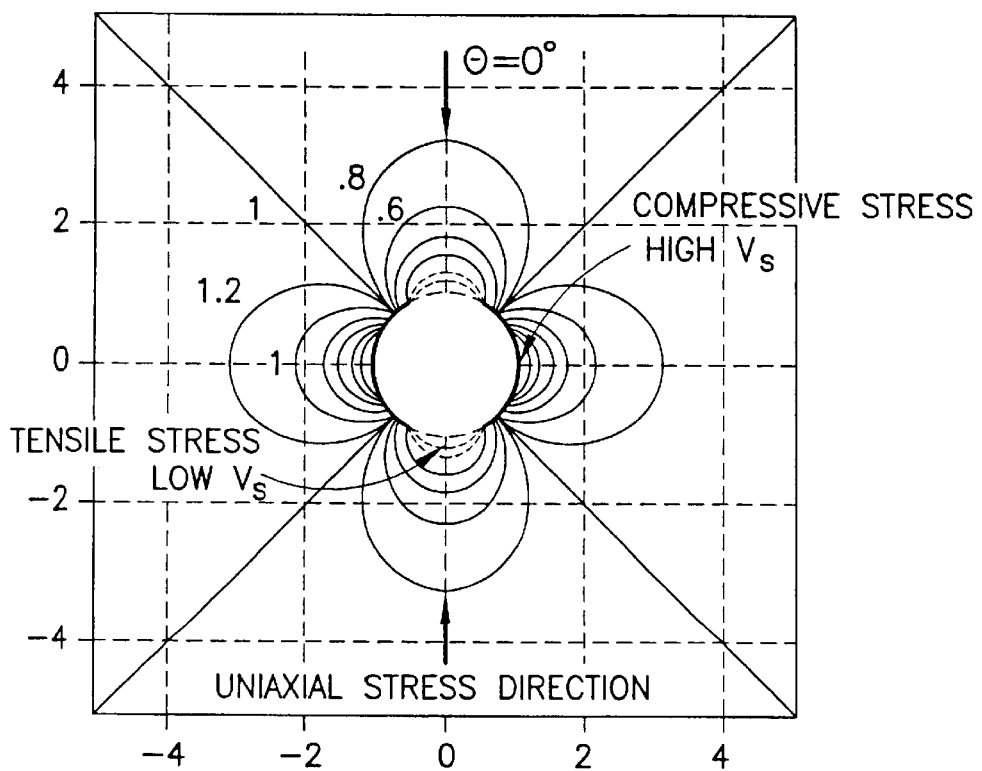
FIG. 10 is a polar plot of the sum of principal stresses caused by a uniaxial stress in the far-field.
Figure 11:
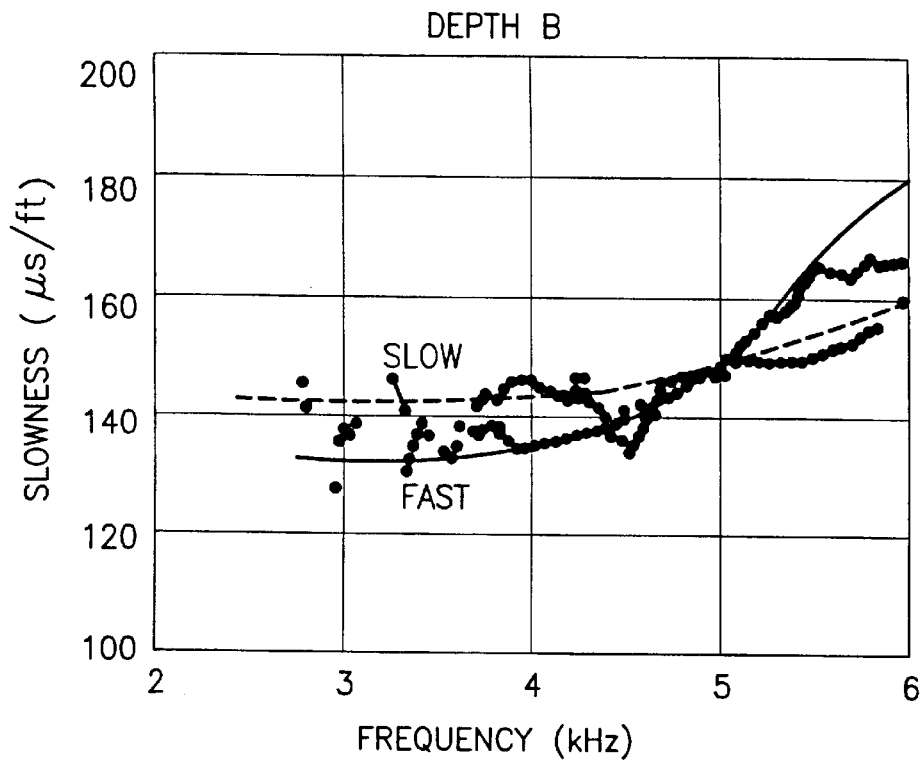
FIG. 11 is a graph of measured flexural dispersions processed from inline (solid line) and crossline (dashed line) receiver waveforms at measured depth of x904 ft.
Figure 12:
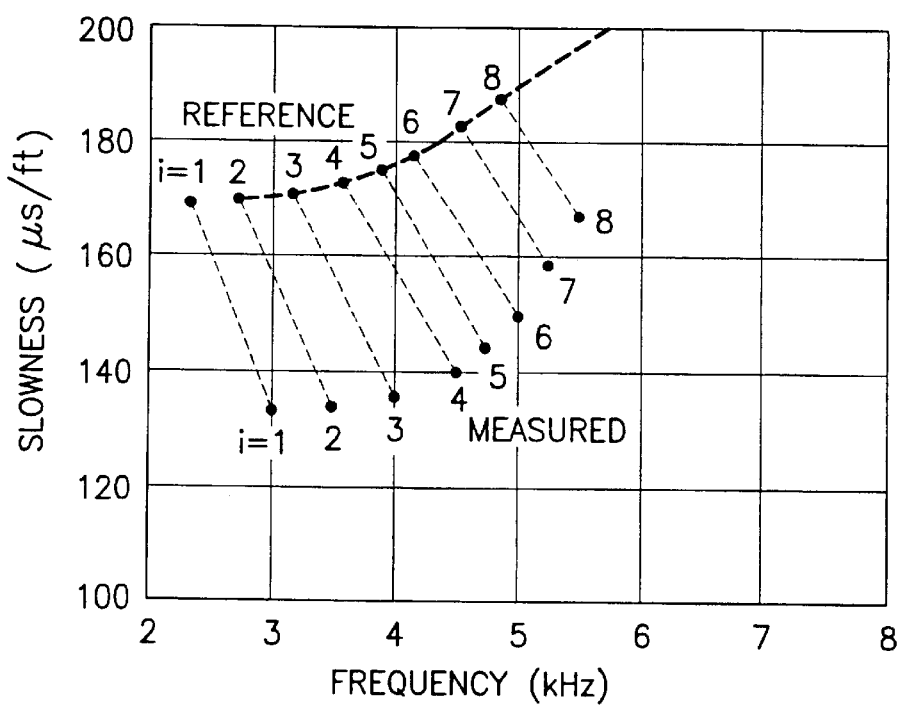
FIG. 12 is a graph of measured slowness from the fast flexural dispersion (shown by discrete points) together with the selected slowness dispersion shown by dashed line in the reference state.
Figure 13:
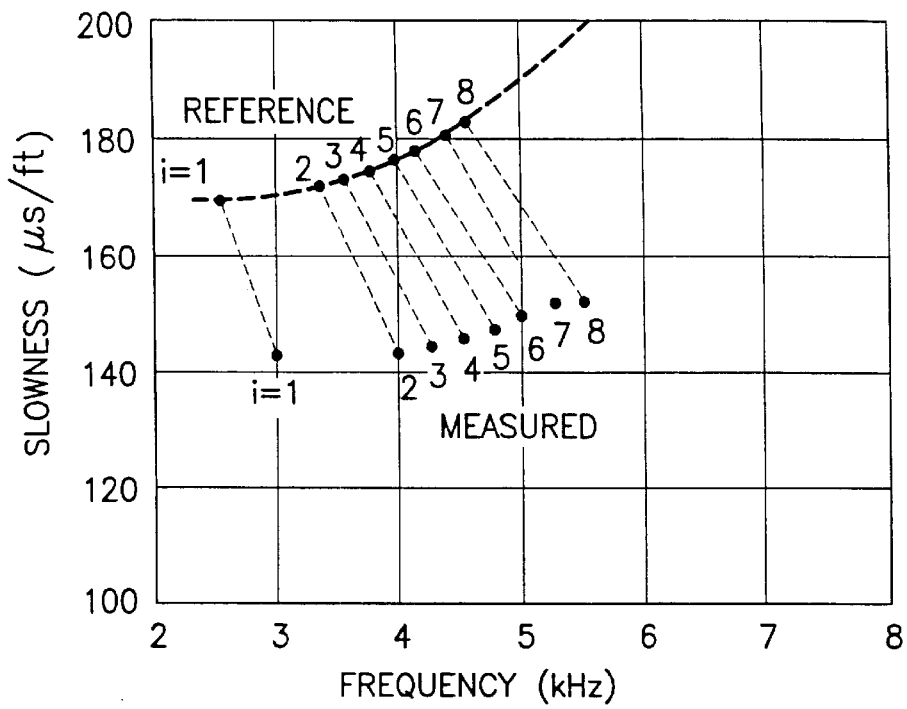
FIG. 13 is a graph of measured slowness from the slow flexural dispersion (shown by discrete points) together with the selected slowness dispersion shown by dashed line in the reference state.
Figure 14:
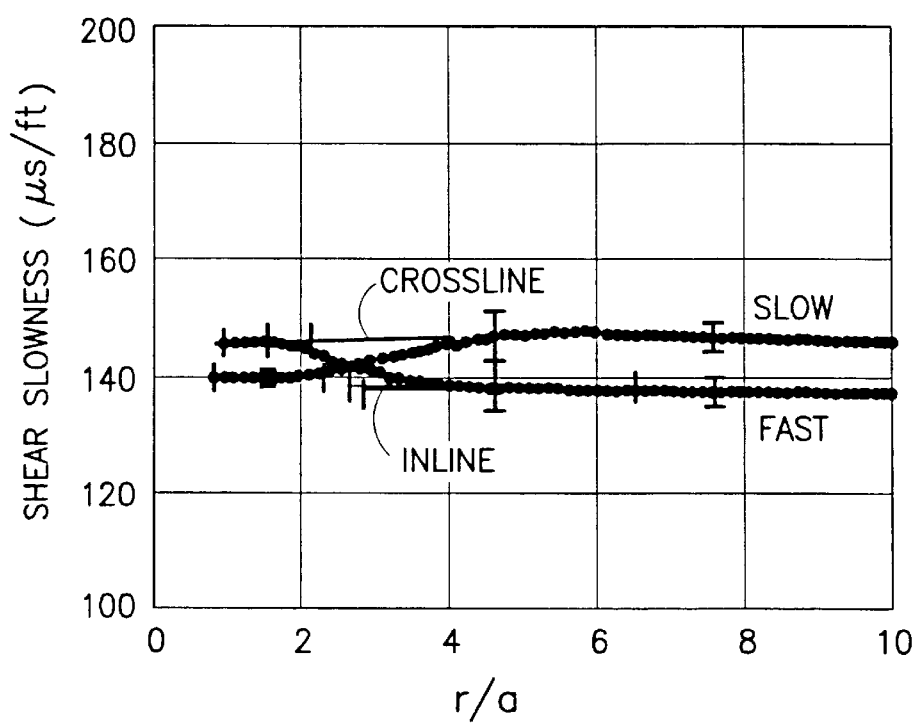
FIG. 14 is a graph of radial variations of inverted shear slownesses obtained from cross-dipole dispersions in a stress-induced anisotropic section. The horizontal ranges denote the radial resolution and the vertical lines denote the error bar in the inverted values.
Figure 15A:
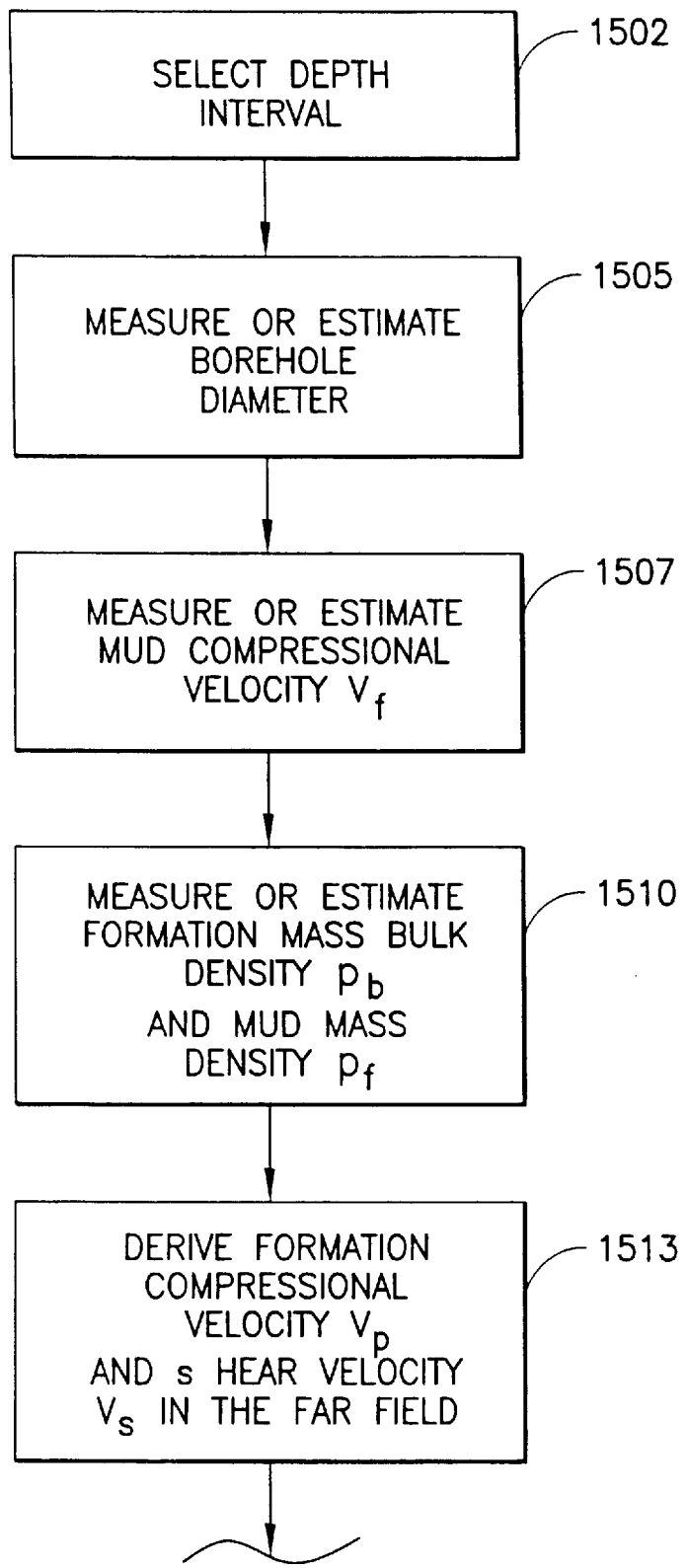
FIG. 15, which includes FIGS. 15A, 15B, 15C, 15D, and 15E, placed one below another, is a flow diagram of a routine for programming a processor to implement a routine in accordance with an embodiment of the invention.
Figure 15B:
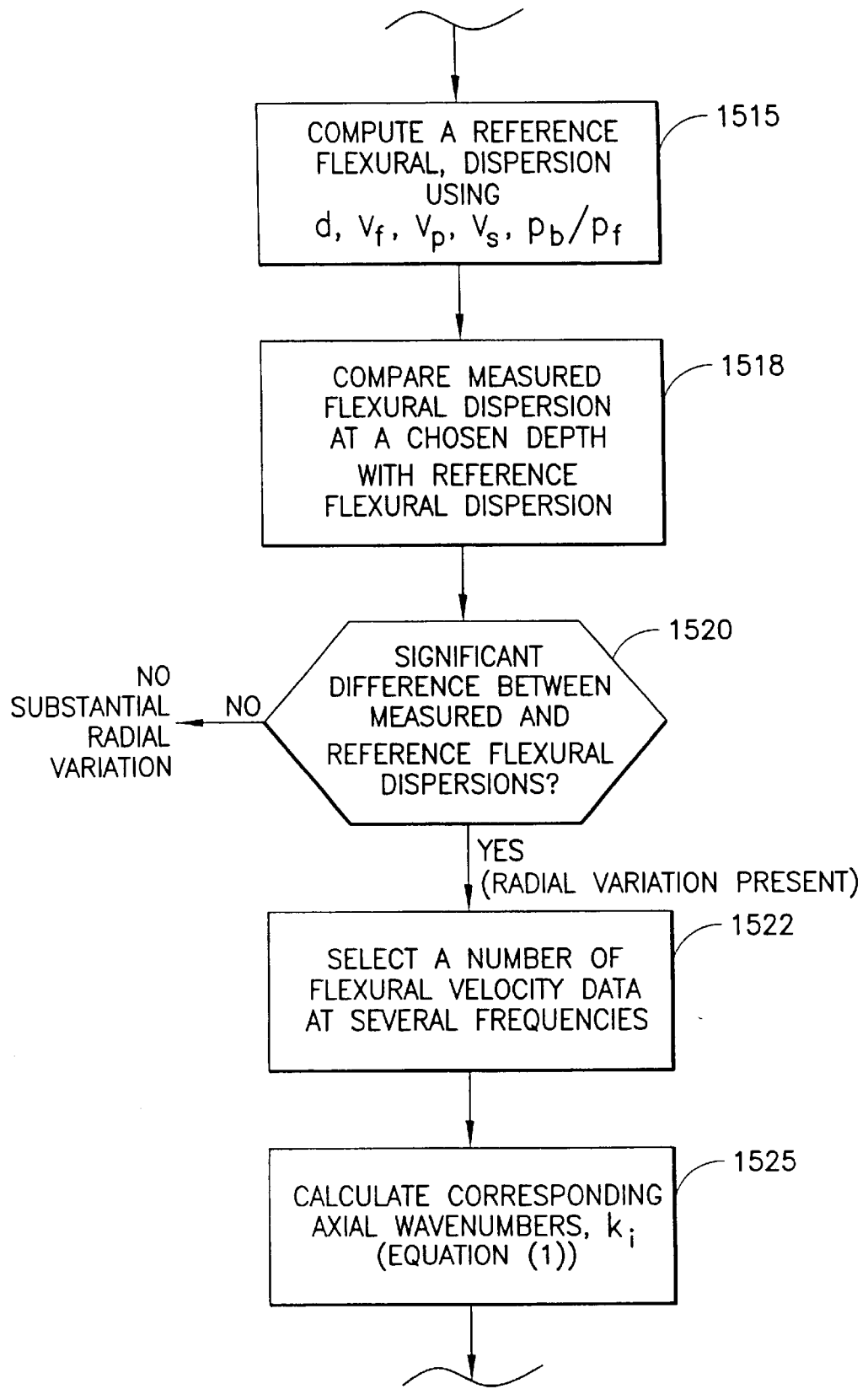
Figure 15C:
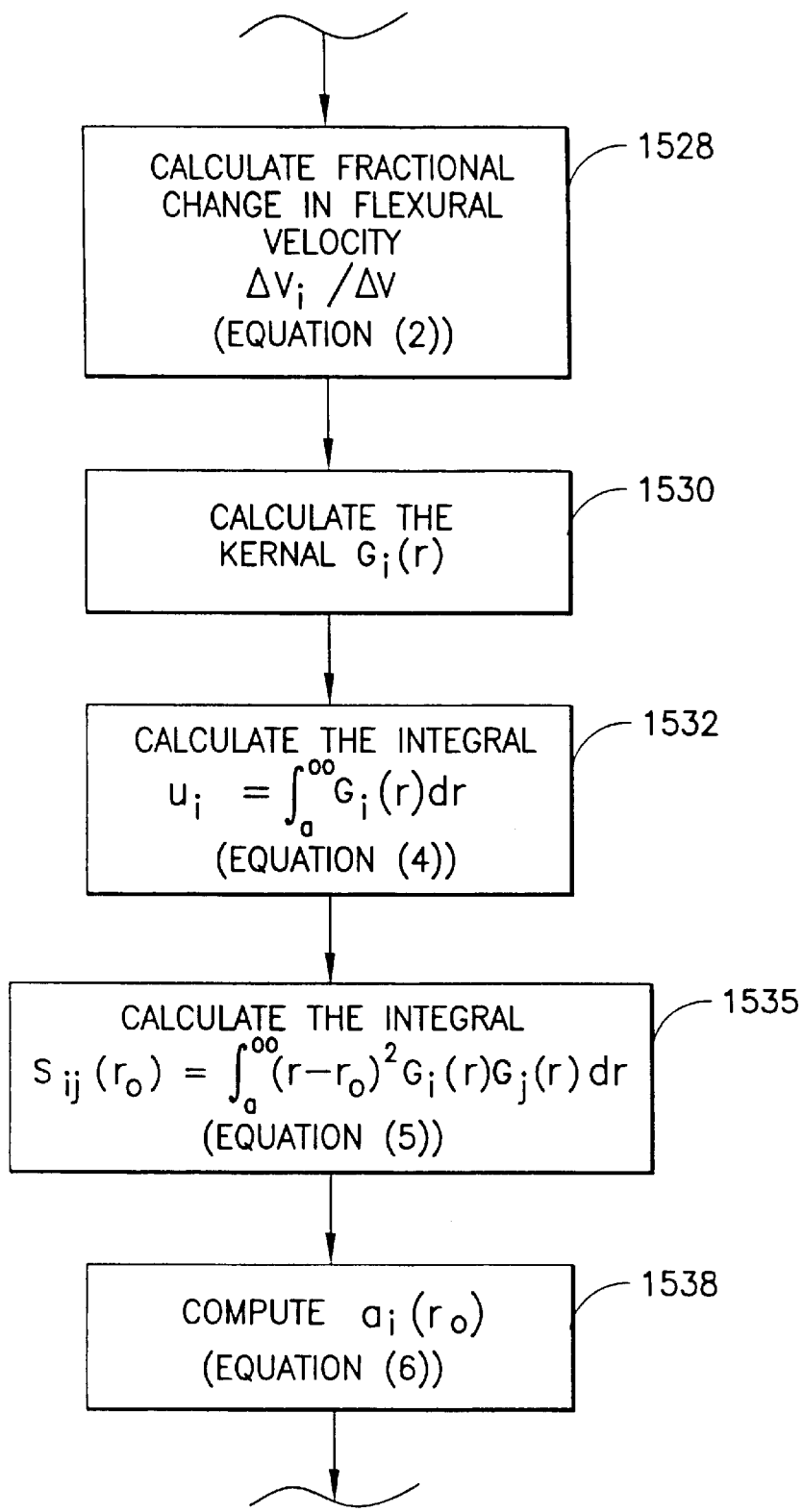
Figure 15D:
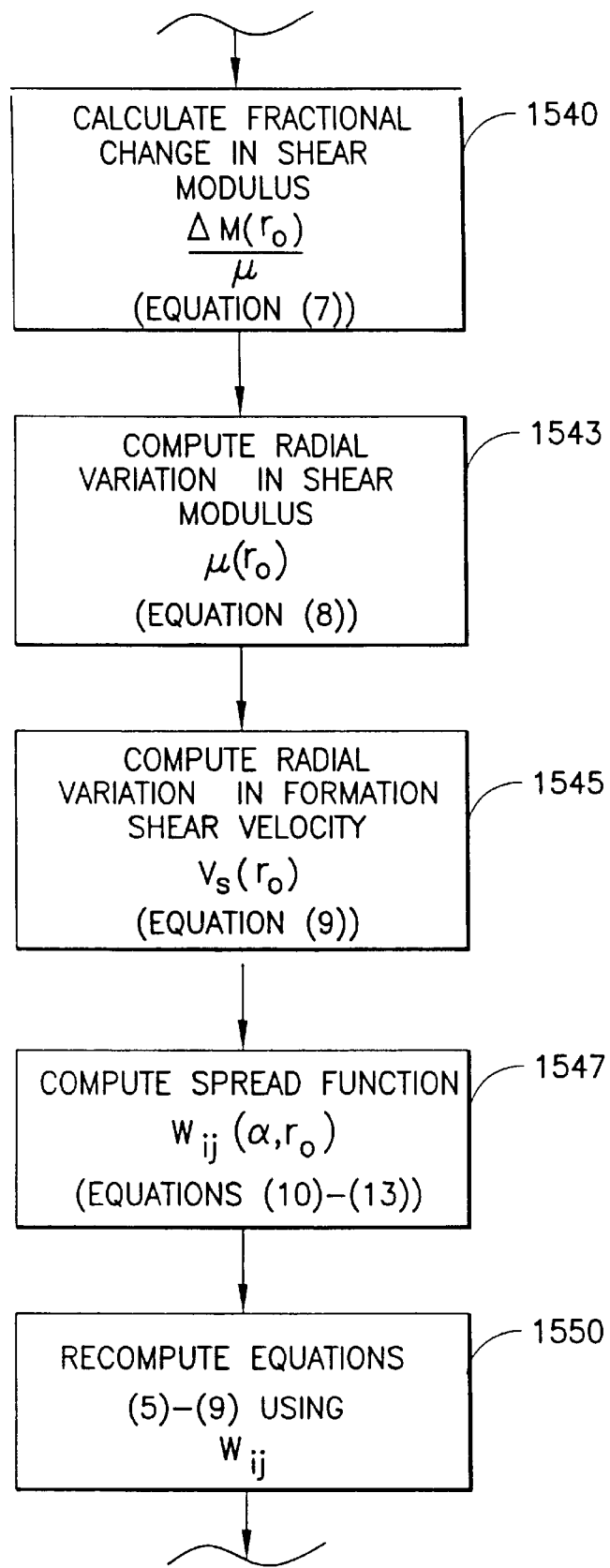
Figure 15E:
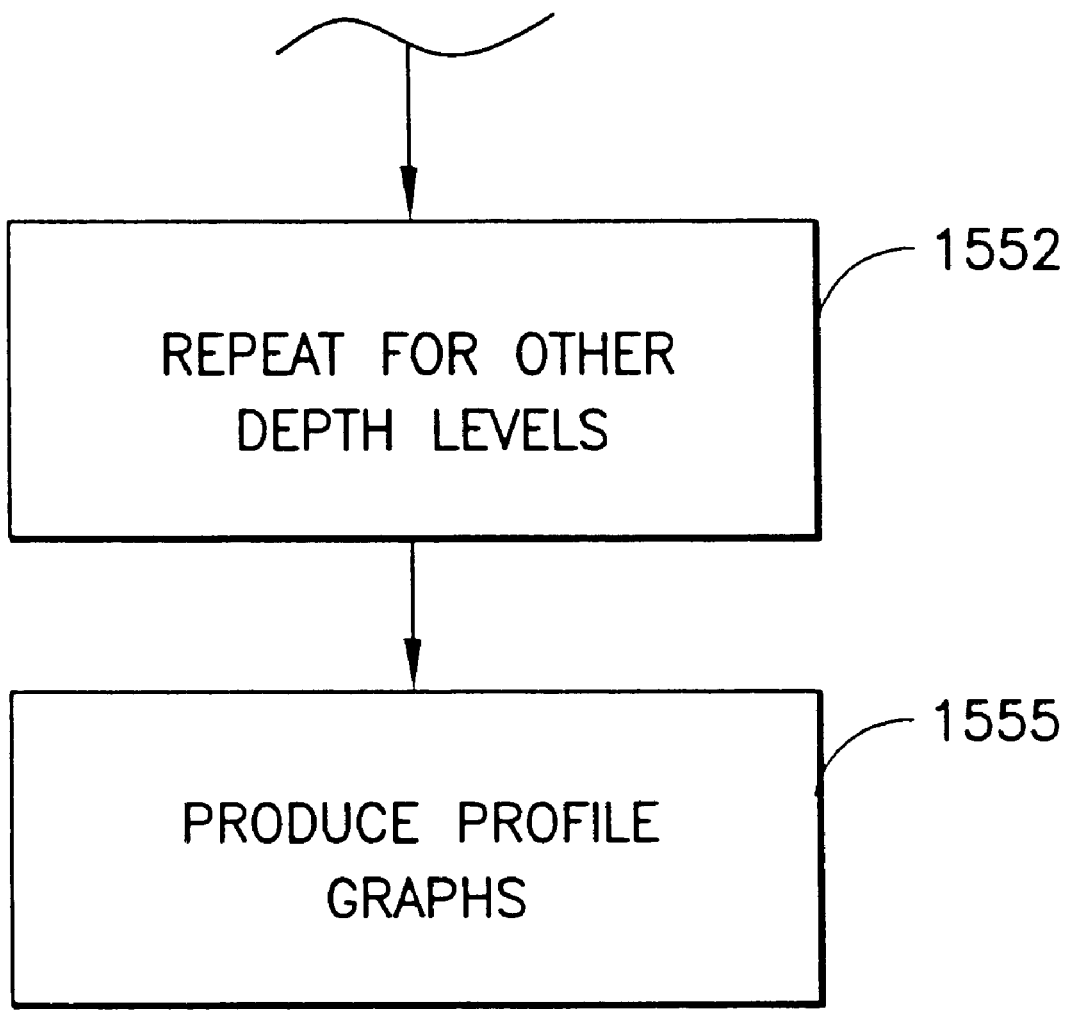

Stress-induced shear anisotropy is caused by the difference in the maximum ($S_X$) and minimum ($S_Y$) stresses in the plane perpendicular to the borehole axis as shown in FIG. 9. FIG. 10 displays a contour polar plot of the sum of the principal stresses in a cross-sectional plane. The section at depth B exhibits a dipole dispersion crossover as shown in FIG. 11. To obtain radial variations in shear slowness along the fast and slow shear directions, the reference state is used for inverting the two flexural dispersions as defined in Table 1 for depth B. FIGS. 12 and 13, respectively, show the measured flexural slownesses together with the reference flexural dispersion for the fast and slow shear directions. FIG. 14 displays radial variations in inverted formation shear slownesses for radial polarizations parallel and perpendicular to the maximum stress direction. In addition to a crossover, one can also observe a stress-induced perturbed annulus extending to about three times the borehole radius.

The foregoing demonstrates that borehole flexural dispersions can be measured over a bandwidth of 3 to 7 kHz in limestone reservoirs. A large bandwidth flexural dispersion permits estimation of formation mecanical attributes as a function of radial depth of investigation in more detail than is possible with refracted headwave measurements. The B-G technique can be used to invert for the radial variation in formation shear slowness from bandlimited flexural dispersion data obtained from several modifications of Prony processing of cross-dipole waveforms. These radial variations help in identifying the radial extent of the altered annulus caused by either stress-induced perturbations or mechanical damage. A mechanically damaged region would exhibit higher slownesses than an undamaged one. A perturbation model relating fractional changes in the formation properties to a corresponding change in flexural slownesses at various frequencies provided a basis for inversion in a linearized system. Both radially increasing and decreasing formation shear slowness profiles can be obtained from the two orthogonal flexural dispersions. These radial profiles clearly show a crossover which is consistent with the dipole dispersion crossover in the presence of stress-induced shear anisotropy dominating the measurement (see K. Winkler, B. Sinha and T. Plona, Effects Of Borehole Stress Concentrations On Dipole Anisotropy Measurements: Geophysics, 63, 11–17, 1998).

A procedure in accordance with an embodiment of the invention will next be described. A depth interval of reasonably uniform lithology is selected. The borehole diameter, d, is measured, for example with a caliper tool. The borehole fluid (mud) compressional velocity, $V_f$, is measured, or can be estimated from the mud composition, mass density, in-situ pressure and temperature, as is known in the art. The formation mass bulk density, $\rho_b$, and the mud mass density, $\rho_f$, are measured or estimated, as is known in the art. The formation mass bulk density can be obtained from neutron-density logging measurements, and the mud mass density can be derived using mud weight information from the drilling fluid supplier.

The compressional velocity $V_p$ and shear velocity $V_s$ of the substantially undisturbed formation (that is, the relatively far-field region outside any mechanically altered annulus) are obtained, for example, from a standard type of sonic log (see, for example, Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990).

Up to this point, the parameters d, $V_f$, $\rho_f$, $\rho_b$, $V_p$ and $V_s$ have been obtained (measured and/or derived and input). A reference flexural dispersion, for a reference formation that is assumed to be homogeneous and isotropic, is then computed, using these parameters and applying a known technique. Reference can be made, for example, to B. K. Sinha, "Sensitivity and Inversion of Borehole Flexural Dispersions for Formation Parameters", Geophysical Journal international, Vol. 128(1), pp. 84–96, January 1997.

As above described, a sonic logging device is utilized to establish flexural waves in the formation, and flexural wave velocity is determined at a number of frequencies to develop a measured dispersion curve at each depth level of interest. A known technique can be employed, for example as described in M. P. Ekstrom, "Dispersion Estimation From Borehole Acoustic Arrays Using A Modified Matrix Pencil Agorithm", presented at the $29^{th}$ Asilomar Conference on Signals, Systems, and Computers, 1995. At the depth level being processed, the measured flexural dispersion is compared with the previously computed reference flexural dispersion. Any observed difference (for example, greater than 4 percent) between the measured and reference borehole flexural dispersions is an indicator of radially varying formation properties. The uncertainty in the measured flexural dispersion may range from about 2 to 4 percent (see e.g. G. Backus and F. Gilbert, Uniqueness In The Inversion Of Inaccurate Gross Earth Data; Phil. Trans. Roy. Soc. (London), A266, 123–192, 1970).

In the presence of a difference between the measured and reference borehole flexural dispersions, a number of flexural velocity data at several frequencies are selected from the measured flexural dispersion. These velocity data should preferably be sufficiently separated in frequency so that they are uncorrelated. A frequency separation of about 200 Hz is generally found to be adequate.

At each of n frequencies, $f_i$, the corresponding axial wavenumbers, $k_i$, are computed as $$k_i = \frac{2\pi f_i}{V_i} \qquad (1)$$

where $V_i$ is the measured flexural velocity at frequency $f_i$.

The fractional changes in the measured flexural velocities from those in the previously computed reference dispersion are then determined. A fractional change in the flexural velocity is given by $$\frac{\Delta V_i}{V_i} = \frac{\left(V_i^{measured} - V_i^{reference}\right)}{V_i^{reference}} \qquad (2)$$

where i=1, 2, . . . n.

The kernel $G_i(r)$ is calculated at each selected wavenumber $k_i$ in terms of the flexural wave solution in the previously defined reference formation. The kernel $G_i(r)$ relates a fractional change in the flexural velocity at a given axial wavenumber $k_i$ from that in the reference isotropic, homogeneous formation to a corresponding fractional change in the shear modulus $\mu$ $$\frac{\Delta V_i}{V_i} = \int_a^\infty G_i \frac{\Delta \mu(r)}{\mu} r dr \qquad (3)$$

where a=d/2, is the borehole radius, and i=1,2, . . . , n. A description of the procedure for determining the kernal $G_i$ is given in B. K. Sinha, "Sensitivity And Inversion Of Borehole Flexural Dispersions For Formation Parameters", Geophysical Journal International, vol. 128(1), pp. 84–96, January 1997. Briefly, $G_i(r)$ is obtained from the eigensolution of a forward boundary value problem consisting of flexural waves propagating in a fluid-filled borehole. Once the kernals $G_i$ have been determined, an objective is to solve equation (3) for $\Delta \mu(r)/\mu$. The following integrals are calculated:

$$u_i = \int_a^\infty G_i(r) r dr, \qquad (4)$$

$$S_{ij}(r_o) = \int_a^\infty (r-r_o)^2 G_i(r) G_j(r) r dr, \qquad (5)$$

where $r_o$ denotes radial position in the formation, and i,j=1,2, . . . n. A vector $a_i(r_o)$, is expressed as $$a_i(r_o) = \frac{S_{ij}^{-1}(r_o) u_j}{u_i S_{ij}^{-1}(r_o) u_j}. \qquad (6)$$

and is a weighting function vector associated with each $G_i(r_o)$. The solution to equation (3), that is, the fractional change in shear modulus, a scalar, can then be calculated from the dot product of the vectors of equations (2) and (6), as follows:

$$\frac{\Delta \mu(r_o)}{\mu} = a_i(r_o) \frac{\Delta V_i}{V_i}, \qquad (7)$$

The radial variation in formation shear modulus (that is, shear modulus as a function of radius, or a shear modulus profile) can then be calculated from the relationship $$\mu(r_o) = \left(1 + \frac{\Delta\mu(r_o)}{\mu}\right)\mu, \tag{8}$$

The radial variation in formation shear velocity (that is, shear velocity as a function of radius, or a shear velocity profile) can then be obtained from $$V_s(r_o) = \left[\left(1 + \frac{\Delta\mu(r_o)}{\mu}\right)\frac{\mu}{\rho_b}\right]^{\frac{1}{2}}, \tag{9}$$

where $\rho_b$ is the formation density.

Consistent with the Backus and Gilbert inverse theory (see Burridge and Sinha, "Inversion For Formation Shear Modulus And Radial Depth Of Investigation Using Borehole Flexural Waves", 66$^{th}$ Annual International Meeting, Society of Exploration Geophysicists, Expanded Abstracts, pp. 158–161, 1996), a trade-off between the error e and radial spread in the inverted shear modulus can be expressed in terms of a and the new spread function W can then be expressed as $$W_{ij}(\alpha, r_o) = E_{ij} + \alpha S_{ij}(r_o), \tag{10}$$

where $$a_i(\alpha, r_o) = \frac{W_{ij}^{-1}(r_o)u_j}{u_i W_{ij}^{-1}(r_o)u_j}, \tag{11}$$

$$s(\alpha, r_o) = a_i(\alpha, r_o) S_{ij}(r_o) a_j(\alpha, r_o), \tag{12}$$

$$e^2 = a_i(\alpha, r_o) E_{ij} a_j(\alpha, r_o). \tag{13}$$

In the presence of error in the measured flexural velocity at various axial wavenumbers $k_i$, expressed in terms of the error covariance matrix $E_{ij}$, and an assumed value of the trade-off parameter a the spread function $W_{ij}$ can be used instead of $S_{ij}(r_o)$, in developing equations (5) through (9) for estimating, the radial variation in the formation shear velocity.

FIG. 15 is a flow diagram which can be used in programming a suitable processor, such as the processor 270 of the surface equipment of FIG. 1 or a remote processor, in practicing an embodiment of the invention. If desired, a downhole processor could also perform at least part of the technique. Data may, for example, be collected and stored using the type of logging apparatus described in conjunction with FIGS. 1–4, although it will be understood that other suitable equipment can be utilized.

The block 1502 represents selection of a depth interval having reasonably uniform lithology. The block 1505 represents the measurement or estimation of borehole diameter, for example using a caliper tool (in the same or a separate logging run). As represented by the blocks 1507 and 1510 the mud compressional velocity $V_f$, and the mud mass density $\rho_f$ and formation mass bulk density $\rho_b$, are measured or estimated, as previously described. The far-field formation compressional velocity $V_p$ and shear velocity $V_s$ are then derived, as represented by the block 1513. These can be measured, in conventional fashion, using the sonic logging tool, at a relatively long transmitter-to-receiver spacing, to obtain these measurements in the far field which are substantially unaffected by damage caused by the drilling of the borehole. Alternatively, these parameters can be input if they are available from another source.

With the parameters d, $V_f$, $V_p$, and $V_s$, as well as $\rho_b/\rho_f$, having been derived, a reference flexural dispersion, for a reference formation that is assumed to be homogeneous and isotropic, can then be computed, as described above (block 1515). Then, as represented by the block 1518, at the depth level being processed, the measured flexural dispersion is compared to the reference flexural dispersion. The decision block 1520 represents the determination of whether or not there is a significant difference between the measured and referenced flexural dispersions. If not, there is probably no substantial radial variation at the depth level being processed. However, if a significant difference is observed, radial variation is probably present. The block 1522 is then entered, this block representing the selection of a number of flexural velocity data at several frequencies. As noted above, these velocity data should preferably be sufficiently separated in frequency so that they are uncorrelated. For each selected frequency, i, a corresponding axial wavenumber, $k_i$, is calculated, in accordance with equation (1) (block 1525). Then, as represented by the block 1528, the fractional change in flexural velocity is calculated in accordance with equation (2). The kernel $G_i(r)$ of equation (3) is then calculated, in accordance with the procedure described above, as represented by the block 1530. Then, as represented by the blocks 1532 and 1535, the integrals $\mu_i$ and $S_{ij}(r_o)$ are calculated in accordance with equations (4) and (5), respectively. The block 1538 is then entered, this block representing the computation of $a_i(r_o)$, in accordance with equation (6). The fractional change in shear modulus is then computed in accordance with equation (7) (block 1540), and the radial variation in shear modulus $\mu(r_o)$ is computed in accordance with equation (8) (block 1543). Then, as represented by the block 1545, the radial variation in formation shear velocity, $V_s(r_o)$ can be computed in accordance with equation (9).

Optionally, as represented by blocks 1547 and 1550, a spread function $W_{ij}(\alpha, r_o)$ can be computed in accordance with equations (10) through (13), and equations (5) through (9) can be recomputed using $W_{ij}$ instead of $S_{ij}$.

Further, the block 1552 represents repeating of the processing for other depth levels, and the block 1555 represents producing of profile graphs, for example graphs of the type shown in FIG. 14, which can be plotted from the processing results.

What is claimed is:

1. A method for determining a radial profile of sonic shear velocity of formations surrounding a fluid-containing borehole, comprising the steps of:

suspending a logging device in the borehole;

transmitting sonic energy from said logging device to establish flexural waves in the formation;

receiving, at said logging device, sonic energy from said flexural waves, and producing from the received sonic energy, measurement signals at a number of frequencies;

determining, at each of said number of frequencies, the flexural wave velocity in the formation;

deriving sonic compressional and shear velocities of the substantially undisturbed formation;

deriving sonic compressional velocity of the borehole fluid; and determining the radial profile of sonic shear velocity from the derived compressional and shear velocities of the substantially undisturbed formation, the derived compressional velocity of the borehole fluid, and the flexural wave velocities at said number of frequencies.

2. The method as defined by claim 1, further comprising the step of deriving the ratio of formation mass bulk density to borehole fluid mass density, and wherein said radial profile of sonic shear velocity is determined from the derived compressional and shear velocities of the substantially undisturbed formation, the derived compressional velocity of the borehole fluid, the derived ratio of formation mass bulk density to borehole fluid mass density, and the flexural wave velocities at said number of frequencies.

3. The method as defined by claim 2, further comprising the steps of deriving a dispersion function from the flexural wave velocities at said number of frequencies, and deriving a reference dispersion function from said derived sonic compressional and shear velocities of the substantially undisturbed formation and the derived ratio of formation mass bulk density to borehole fluid mass density, and determining, at selected frequencies, the differences between velocities obtained from said dispersion function and said reference dispersion function, and wherein said radial profile of sonic shear velocity is determined from said differences.

4. The method as defined by claim 3, further comprising the step of deriving, at said selected frequencies, the fractional changes in flexural velocity, from the respective ratios of said differences to said velocities obtained from said reference dispersion function, and wherein said radial profile of sonic shear velocity is determined from said fractional changes in flexural velocity.

5. The method as defined by claim 3, further comprising the step of determining the radial variation in formation shear modulus from said differences, and wherein said radial profile of sonic shear velocity is determined from said radial variation in formation shear modulus.

6. The method as defined by claim 5, further comprising determining, at each of said selected frequencies, a kernel that relates said fractional changes in flexural velocity to respective fractional changes in formation shear modulus, and wherein said kernels are utilized in determining said radial variation in formation shear modulus.

7. Apparatus for determining a radial profile of sonic shear velocity of formations surrounding a fluid-containing borehole, comprising:
   a logging device suspendible in the borehole;
   means for transmitting sonic energy from said logging device to establish flexural waves in the formation;
   means for receiving, at said logging device, sonic energy from said flexural waves, and for producing from the received sonic energy, measurement signals at a number of frequencies;
   means for determining, at each of said number of frequencies, the flexural wave velocity in the formation;
   means for deriving sonic compressional and shear velocities of the substantially undisturbed formation;
   means for deriving sonic compressional velocity of the borehole fluid; and
   means for determining the radial profile of sonic shear velocity from the derived compressional and shear velocities of the substantially undisturbed formation, the derived compressional velocity of the borehole fluid, and the flexural wave velocities at said number of frequencies.

8. Apparatus as defined by claim 7, further comprising means for deriving the ratio of formation mass bulk density to borehole fluid mass density, and wherein said radial profile of sonic shear velocity is determined from the derived compression and shear velocities of the substantially undisturbed formation, the derived compressional velocity of the borehole fluid, the derived ratio of formation mass bulk density to borehole fluid mass density, and the flexural wave velocities at said number of frequencies.

9. Apparatus as defined by claim 7, further comprising means for deriving a dispersion function from the flexural wave velocities at said number of frequencies, and means for deriving a reference dispersion function from said derived sonic compressional and shear velocities of the substantially undisturbed formation and the derived ratio of formation mass bulk density to borehole fluid mass density, and means for determining, at selected frequencies, the differences between velocities obtained from said dispersion function and said reference dispersion function, and wherein said radial profile of sonic shear velocity is determined from said differences.

10. Apparatus as defined by claim 9, further comprising means for deriving, at said selected frequencies, the fractional changes in flexural velocity, from the respective ratios of said differences to said velocities obtained from said reference dispersion function, and wherein said radial profile of sonic shear velocity is determined from said fractional changes in flexural velocity.

11. Apparatus as defined by claim 9, further comprising means for determining the radial variation in formation shear modulus from said differences, and wherein said radial profile of sonic shear velocity is determined from said radial variation in formation shear modulus.

12. Apparatus as defined by claim 10, further comprising means for determining, at each of said selected frequencies, a kernel that relates said fractional changes in flexural velocity to respective fractional changes in formation shear modulus, said kernels being utilized in determining said radial variation in formation shear modulus.

13. A method for determining the radial variation in shear modulus of formations surrounding a fluid-containing borehole, comprising the steps of:
   suspending a logging device in the borehole;
   transmitting sonic energy from said logging device to establish flexural waves in the formation;
   receiving, at said logging device, sonic energy from said flexural waves, and producing from the received sonic energy, measurement signals at a number of frequencies;
   determining, at each of said number of frequencies, the flexural wave velocity in the formation;
   deriving sonic compressional and shear velocities of the substantially undisturbed formation;
   deriving sonic compressional velocity of the borehole fluid; and
   determining the radial variation in shear modulus from the derived compressional and shear velocities of the substantially undisturbed formation, the derived compressional velocity of the borehole fluid, and the flexural wave velocities at said number of frequencies.

14. The method as defined by claim 13, further comprising the step of deriving the ratio of formation mass bulk density to borehole fluid mass density, and wherein said radial variation in shear modulus is determined from the derived compressional and shear velocities of the substantially undisturbed formation, the derived compressional velocity of the borehole fluid, the derived ratio of formation mass bulk density to borehole fluid mass density, and the flexural wave velocities at said number of frequencies.

15. The method as defined by claim 14, further comprising the steps of deriving a dispersion function from the flexural wave velocities at said number of frequencies, and deriving a reference dispersion function from said derived sonic compressional and shear velocities of the substantially undisturbed formation and the derived ratio of formation mass bulk density to borehole fluid mass density, and determining, at selected frequencies, the differences between velocities obtained from said dispersion function and said reference dispersion function, and wherein said radial variation in shear modulus is determined from said differences.

16. The method as defined by claim 15, further comprising the step of deriving, at said selected frequencies, the fractional changes in flexural velocity, from the respective ratios of said differences to said velocities obtained from said reference dispersion function, and wherein said radial variation in shear modulus is determined from said fractional changes in flexural velocity.

17. The method as defined by claim 16, further comprising determining, at each of said selected frequencies, a kernel that relates said fractional changes in flexural velocity to respective fractional changes in formation shear modulus, and wherein said kernels are utilized in determining said radial variation in formation shear modulus.

18. For use in conjunction with a technique for investigating formations surrounding a fluid-containing borehole that includes the steps of: suspending a logging device in the borehole; transmitting sonic energy from the logging device to establish flexural waves in the formation; receiving, at the logging device, sonic energy from the flexural waves, and producing from the received sonic energy, measurement signals at a number of frequencies; a method for determining a radial profile of sonic shear velocity of the formation comprising the steps of:

deriving sonic compressional and shear velocities of the substantially undisturbed formation;

deriving sonic compressional velocity of the borehole fluid;

determining, at each of said number of frequencies, the flexural wave velocity in the formation; and determining the radial profile of sonic shear velocity from the derived compressional and shear velocities of the substantially undisturbed formation, the derived compressional velocity of the borehole fluid, and the flexural wave velocities at said number of frequencies.

19. The method as defined by claim 18, further comprising the step of deriving the ratio of formation mass bulk density to borehole fluid mass density, and wherein said radial profile of sonic shear velocity is determined from the derived compressional and shear velocities of the substantially undisturbed formation, the derived compressional velocity of the borehole fluid, the derived ratio of formation mass bulk density to borehole fluid mass density, and the flexural wave velocities at said number of frequencies.

20. The method as defined by claim 19, further comprising the steps of deriving a dispersion function from the flexural wave velocities at said number of frequencies, and deriving a reference dispersion function from said derived sonic compressional and shear velocities of the substantially undisturbed formation and the derived ratio of formation mass bulk density to borehole fluid mass density, and determining, at selected frequencies, the differences between velocities obtained from said dispersion function and said reference dispersion function, and wherein said radial profile of sonic shear velocity is determined from said differences.

21. The method as defined by claim 20, further comprising the step of deriving, at said selected frequencies, the fractional changes in flexural velocity, from the respective ratios of said differences to said velocities obtained from said reference dispersion function, and wherein said radial profile of sonic shear velocity is determined from said fractional changes in flexural velocity.

22. The method as defined by claim 20, further comprising the step of determining the radial variation in formation shear modulus from said differences, and wherein said radial profile of sonic shear velocity is determined from said radial variation in formation shear modulus.

23. The method as defined by claim 22, further comprising determining, at each of said selected frequencies, a kernel that relates said fractional changes in flexural velocity to respective fractional changes in formation shear modulus, and wherein said kernels are utilized in determining said radial variation in formation shear modulus.

\* \* \* \* \*